E. VERLOOVE.
AUTOMOBILE BUMPER.
APPLICATION FILED JULY 26, 1921.
1,394,238. Patented Oct. 18, 1921.
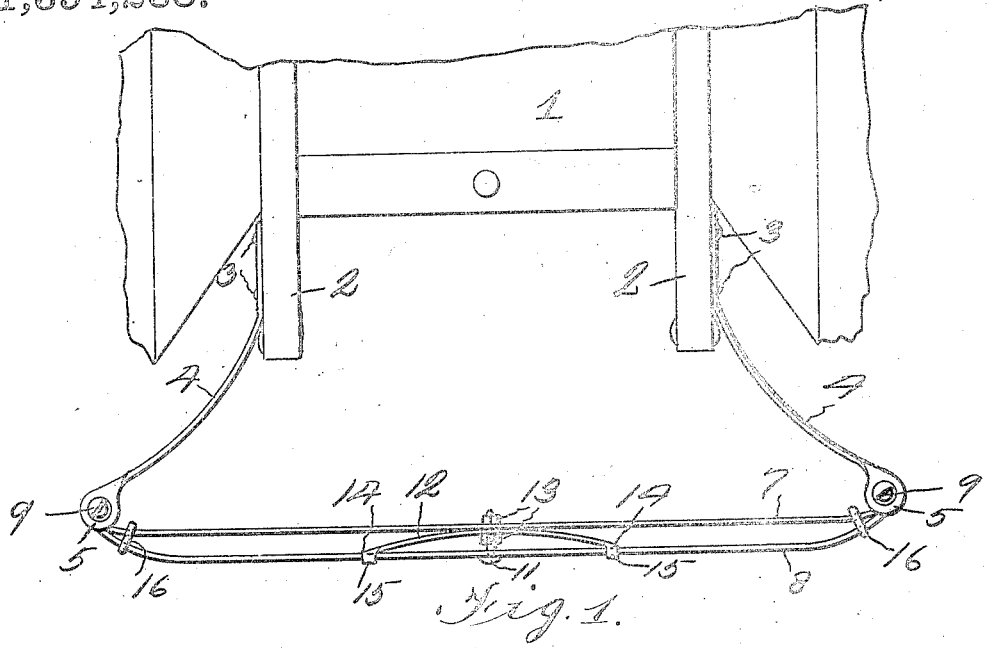
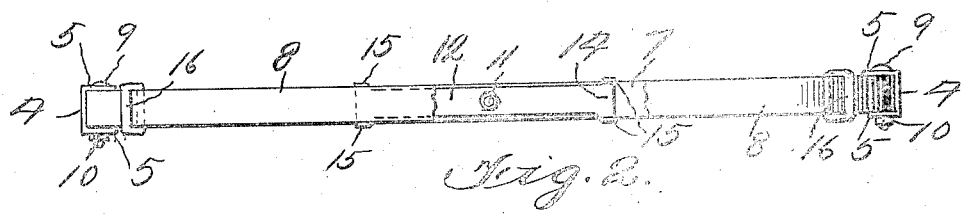
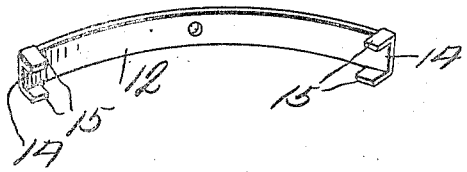
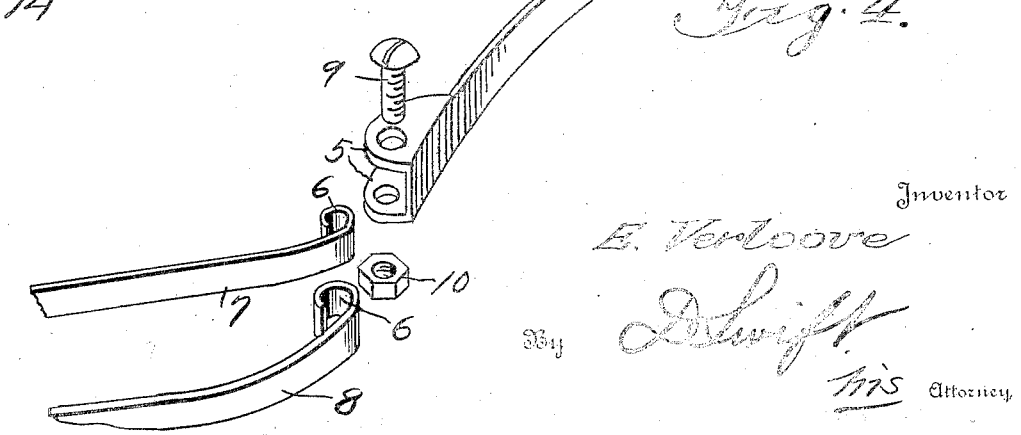
Inventor
E. Verloove
his Attorney

UNITED STATES PATENT OFFICE.

EDMOND VERLOOVE, OF BAD AXE, MICHIGAN.

AUTOMOBILE-BUMPER.

1,394,238.　　　　Specification of Letters Patent.　　Patented Oct. 18, 1921.

Application filed July 26, 1921. Serial No. 487,595.

*To all whom it may concern:*

Be it known that I, EDMOND VERLOOVE, a citizen of the United States, residing at Bad Axe, in the county of Huron, State of Michigan, have invented a new and useful Automobile-Bumper; and I do hereby declare the following to be a full, clear, and exact description of the invention, such as will enable others skilled in the art to which it appertains to make and use the same.

The invention relates to automobile bumpers and has for its object to provide a bumper which will have considerable spring action, thereby obviating bending and breaking of the bumper incident to collision or running into objects, and also providing means for reducing the shock to a minimum in case of collision.

A further object is to provide an automobile bumper comprising forwardly and outwardly extending spring arms carried by the vehicle frame, said spring arms being connected together by spring bars which merge together at their ends and are secured to the forwardly and outwardly extending arms, said spring bars having disposed therebetween a bowed spring forming a central stiffening spring means for the spring bars.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a top plan view of the bumper showing the same applied to a conventional form of automobile frame.

Fig. 2 is a front view of the bumper, one of the spring bars being broken away to show the bowed spring reinforcing member.

Fig. 3 is a perspective view of the bowed spring member.

Fig. 4 is a collective view showing one of the frame carried arms and the adjacent parts in position to be assembled.

Referring to the drawings, the numeral 1 designates a conventional form of automobile and 2 the side rails of a frame thereof. Secured at 3 to the forward ends of the sides 2 are forwardly and outwardly extending spring arms 4, which arms terminate in horizontally disposed spaced ears 5. Disposed between the ears 5 are interengaged rolls 6 of the spring bars 7 and 8, the rolls 6 of the spring bar 8 being larger than the roll of the spring bar 7 and are held in interengaged position by means of bolts 9 which pass through the ears 5 and the rolls and have threaded thereon nuts 10 for securely holding the spring bars 7 and 8 against displacement at their outer ends. The spring bars 7 and 8 are spaced from each other as shown in Fig. 1 thereby providing flexible members which when the bumper as a whole engages an obstruction will flex in such a manner as to prevent bending of the bumper and at the same time break the shock in such a manner that it will be reduced to a minimum, thereby obviating danger of injury to persons within the vehicle, and at the same time reducing the strain on the various parts of the vehicle to a minimum.

To additionally stiffen the spaced bars 7 and 8 at a point substantially centrally thereof on a bolt 11, a bowed spring 12 is disposed, said bolt passing through the bowed spring and through the bar 7 is provided with nuts 13 by means of which nuts the bolt 11 is secured in place and also the spring bars 7 and 8 are forced inwardly or outwardly in relation to each other thereby varying the flexing action of the bowed spring 12 for varying the stiffness of the bumper as a whole. The ends 14 of the bowed spring 12 are provided with spaced lugs 15 which lugs overlie the upper and lower edges of the spring bar 8 and prevent displacement of the bowed spring 12. Slidably mounted on the ends of the spring bars 7 and 8 adjacent their pivotal points are collars 16 by means of which collars the outward springing of the bars 7 and 8 in relation to each other may be regulated by positioning the collars in various positions on the bars.

From the above it will be seen that an automobile bumper is provided which is simple in construction and one wherein upon collision the initial shock of the collision will be taken up in such a manner as to reduce the shock to a minimum and at the same time so constructed that the bumper itself will not be damaged.

The invention having been set forth what is claimed as new and useful is:—

The combination with an automobile frame, of a spring bumper therefor, said bumper comprising forwardly and outwardly extending horizontally disposed spring arms, the outer ends of said arms terminating in inwardly extending horizontally disposed spaced ears, spring bars having their ends interengaged and pivoted between the spaced ears of the spring arms, said spring bars being spaced apart, a bowed spring secured to one of said spring bars and having its ends slidably engaging the adjacent face of the other spring bar, ears carried by the ends of said bowed spring and overlying the edges of one of the spring bars, and slidable collars carried by the spring bars adjacent their ends and forming means whereby the tension of the bowed spring may be varied by holding the spring bars in various spaced positions in relation to each other.

In testimony whereof I have signed my name to this specification in the presence of two subscribing witnesses.

EDMOND VERLOOVE.

Witnesses:
 LOUIS POPPY,
 WM. E. HAHN.